Figure 1:
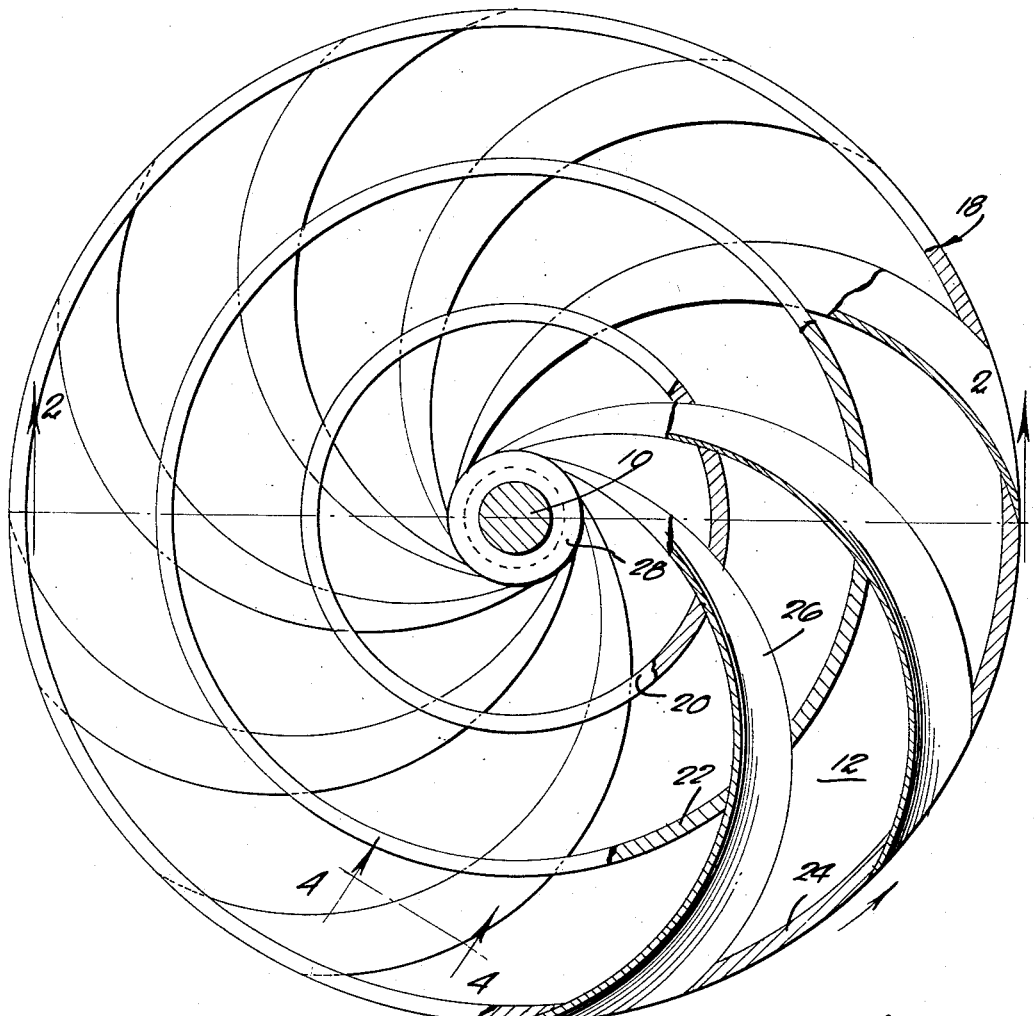

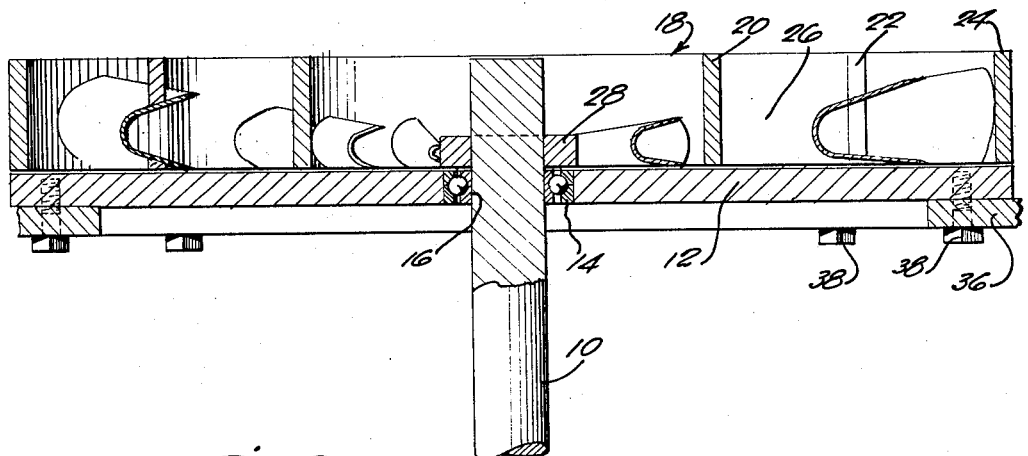

3,139,935
LIFTING DEVICE FOR AIRCRAFT
Frank C. Cleaver, Sr., 2749 B St., San Diego, Calif.
Filed May 17, 1963, Ser. No. 281,256
5 Claims. (Cl. 170—135)

The present invention relates generally to aircraft and in particular to a new and novel system for obtaining lift in an aircraft.

An object of the present invention is to provide a new and novel device to produce a partial vacuum or low pressure area above a fixed surface in an aircraft to thereby provide lift for the aircraft.

Another object of the present invention is to provide in a lifting device for an aircraft, a means for providing a low pressure area above an aircraft surface which, independent of downward thrust of moving air or jet principals, effects the lifting of the aircraft by the low pressure or vacuum alone.

A further object of the present invention is to provide in a lifting device for an aircraft a fixed stator or plate above which is arranged a rapidly spinning rotor for driving air outwardly over the plate, such air being received from the area immediately above the rotor to thereby create a low pressure or partial vacuum area above the rotor and attached aircraft.

These and other objects and advantages of the present invention will be apparent from the following description when taken in connection with the annexed drawings, in which:

FIGURE 1 is a top plan view of the lifting device according to the present invention, an arrow indicating the direction of rotation of the rotor, FIGURE 2 is a view taken on the line 2—2 of FIGURE 1, FIGURE 3 is a side elevational view, and FIGURE 4 is a view taken on the line 4—4 of FIGURE 1 and on an enlarged scale.

Referring in detail to the drawings, in which like numerals indicate like parts throughout the several views, the lifting device for aircraft according to the present invention consists in a drive shaft 10 extending vertically through a base plate 12 and supported in a bearing 14 surrounding a hole 16 in the base plate 12.

The base plate 12 is adapted to be secured anywhere on an aircraft facing the upper air and preferably on top of a wing or fuselage where lift is required.

The lower end of the drive shaft 10 is adapted for connection to a prime mover such as an internal combustion engine or other motor means in the aircraft.

Above and in close proximity to the upper surface of the base plate 12 is a rotor assembly designated generally by the reference numeral 18.

The rotor assembly consists in a plurality of concentric rings 20, 22, and 24, for example.

The aforesaid rings support a plurality of spaced helical vanes 26 each of a U-shaped cross-sectional configuration as shown most clearly in FIGURE 4. The vanes 26 have their inner ends secured to a hub 28 secured on the shaft 10 and the vanes 26 taper in width from the hub 28 to the free end thereof exteriorly of the outer ring 24.

As shown most clearly in FIGURE 4, the free end of one leg 30 of the vanes 26 is beveled to have a flat lower face as at 32 spaced in close proximity to the upper surface of the base plate 12 as indicated by a dotted line at 34. This spacing can be as much as a few thousandths of an inch and the closer to the base plate the vanes 26 rotate the more effective is the propulsion and lift of the aircraft in which the device of the present invention is installed. It is intended that the upper surface of the base plate 12 be polished to a mirror surface and that the contiguous edges of the rotor assembly 28 includes the rings 20, 22, and 24, as well as the vanes 26, also have their edges and surfaces polished to a high degree.

Means (not shown) may be provided for adjusting the proximity of the rotor assembly 18 to the upper surface of the plate 12. This means may be hydraulic, electric, or mechanical as desired.

The degree of lift obtained by the device of the present invention is controllable by either varying the space between the rotor assembly 18 and the base plate 12 or by varying the rate of rotation of the drive shaft 10.

In a preferred form of the invention some means is provided for maintaining the base plate 12 in a flat horizontally disposed condition and this may encompass a supporting ring 36 secured to the base plate 12 by a plurality of spaced bolts 38 as in FIGURE 2.

While a particular size and shape is shown for the rotor assembly 18, other shapes and sizes may be employed and various diameters of the rotor 18 may be used to obtain the lift desired.

In operation, the drive shaft 10 rotates the rotor assembly 18 in the direction of the arrow shown in FIGURE 1 to create an area of low pressure immediately above the rotor assembly 18, this area of low pressure serving to provide lift to the aircraft in which the device of the present invention is installed.

Obviously, other uses may be found for the device of the present invention in which any type of lift or drive is needed and which may be satisfied by the creation of a partial vacuum or a low pressure area over a given surface. The degree of lift may be varied by either slowing down the rotation of the shaft or by increasing the gap between the rotor assembly 18 and the upper surface of the base plate 12 by any desirable mechanism.

Obviously with a given horsepower a useful load besides the aircraft may be lifted and transported at will of the operator.

While only a preferred form of the invention has been shown and described, other embodiments of the invention are contemplated and numerous changes and modifications may be made in the device without departing from the spirit thereof as set forth in the appended claims.

What is claimed is:

1. In a lifting device for an aircraft, a horizontally disposed base plate provided with a smooth upper surface, said plate being adapted for securement to the upper surface of an aircraft, there being provided a hole in said plate, a rotary drive shaft projecting upwardly through said hole, a plurality of spaced rings concentrically disposed with respect to said drive shaft, and a plurality of spaced vanes projecting outwardly from said shaft and extending through said rings above said plate, each of said vanes being U-shaped in cross sectional configuration, said vanes having their legs facing in the direction of rotation of said shaft, said shaft being adapted for driving by a prime mover mounted in said aircraft.

2. In a lifting device for an aircraft, a horizontally disposed base plate provided with a smooth upper surface, said plate being adapted for securement to an upper surface of an aircraft, there being provided a hole in said plate, bearing means contiguous to said hole, a rotary drive shaft projecting upwardly through said hole and supported in said bearing means, a plurality of rings concentrically disposed with respect to said drive shaft, and a plurality of spaced vanes projecting outwardly from said shaft and extending through said rings above said plate, each of said vanes being U-shaped in cross sectional configuration, said vanes having their legs facing in the direction of rotation of said shaft, said shaft being adapted for driving by a prime mover mounted in said aircraft.

3. In a lifting device for an aircraft, a horizontally disposed base plate provided with a smooth upper surface, said plate being adapted for securement to an upper surface of an aircraft, there being provided a hole in said plate, bearing means contiguous to said hole, a rotary drive shaft projecting upwardly through said hole and supported in said bearing means, a plurality of rings concentrically disposed with respect to said drive shaft, and a plurality of spaced vanes projecting outwardly from said shaft extending through said rings above and in close proximity to said plate, each of said vanes being U-shaped in cross sectional configuration, said vanes having their legs facing in the direction of rotation of said shaft, said shaft being adapted for driving by a prime mover mounted in said aircraft.

4. In a lifting device for an aircraft, a horizontally disposed base plate provided with a smooth upper surface, said plate being adapted for securement to an upper surface of an aircraft, there being provided a hole in said plate, bearing means contiguous to said hole, a rotary drive shaft projecting upwardly through said hole and supported in said bearing means, a plurality of rings disposed concentrically with respect to said drive shaft, and a plurality of spaced vanes projecting outwardly from said shaft extending through said rings above said plate, each of said vanes being U-shaped in cross sectional configuration and having one leg thereof in close proximity to said plate, said vanes having their legs facing in the direction of rotation of said shaft, said shaft being adapted for driving by a prime mover mounted in said aircraft.

5. In a lifting device for an aircraft, a horizontally disposed base plate provided with a smooth upper surface, said plate being adapted for securement to an upper surface of an aircraft, there being provided a hole in said plate, bearing means contiguous to said hole, a rotary drive shaft projecting upwardly through said hole and supported in said bearing means, a plurality of rings disposed concentrically with respect to said drive shaft, and a plurality of spaced vanes projecting outwardly from said shaft extending through said rings above said plate, each of said vanes being U-shaped in cross sectional configuration and having one leg thereof in close proximity to said plate, said vanes having their legs facing in the direction of rotation of said shaft, said shaft being adapted for driving by a prime mover mounted in said aircraft, said vanes being helical in shape and tapering in width from the shaft end to the free end.

References Cited in the file of this patent

UNITED STATES PATENTS

| | | |
|---|---|---|
| 2,138,999 | Clark | Dec. 6, 1938 |
| 2,270,686 | Moore | Jan. 20, 1942 |
| 2,531,748 | Still | Nov. 28, 1950 |

FOREIGN PATENTS

| | | |
|---|---|---|
| 975,539 | France | Oct. 11, 1950 |